March 7, 1961 F. NETTEL 2,973,622
ELASTIC FLUID POWER PLANT FOR INTERMITTENT OPERATION
Filed April 7, 1959
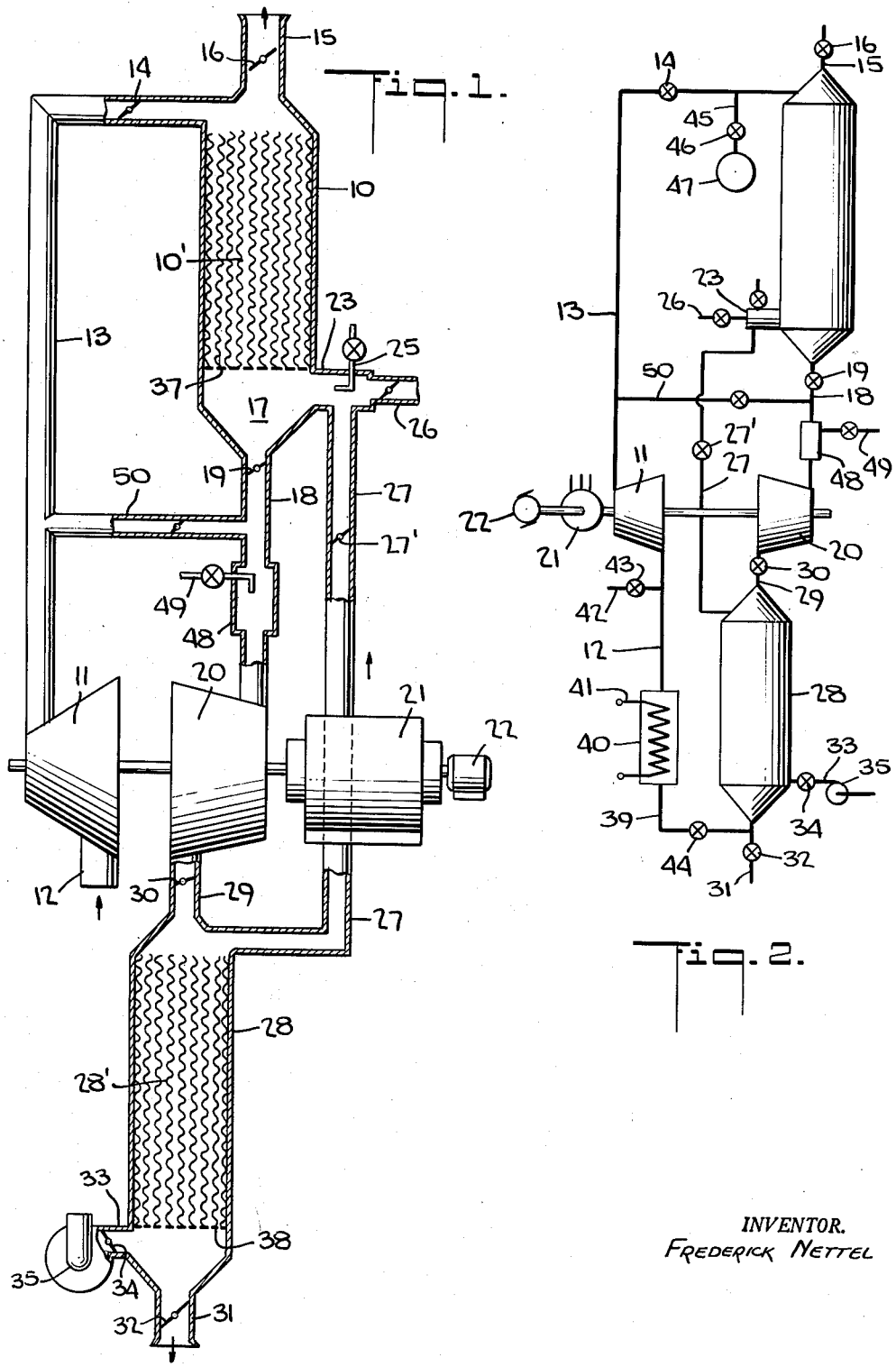
INVENTOR.
FREDERICK NETTEL

United States Patent Office 2,973,622
Patented Mar. 7, 1961

2,973,622
ELASTIC FLUID POWER PLANT FOR INTERMITTENT OPERATION

Frederick Nettel, 173 Chapel Road, Manhasset, N.Y.

Filed Apr. 7, 1959, Ser. No. 804,614

7 Claims. (Cl. 60—39.51)

This invention deals with elastic fluid power plants for intermittent operation involving the use of solid material as heat carrier. The use of solid material for heat storage is known per se, its principal application being in regenerative heat exchangers for air heating in steam boilers, metallurgical furnaces, and in gas or air turbine power plants. Often moving, rotating matrices of solid mtaerial are employed in form of sheets, wires, rods, pellets, for examples. In all such known heat exchangers of the regenerative type, minimum matrix weight is aimed at which leads to short cycling time between heating and cooling of the matrix, which proceeds simultaneously. This time varies with the application generally from about half a minute to about 30 minutes in blast furnace stoves. A part of high heat capacity per unit weight, the matrices must show low flow resistance to the air, gas or vapor passing through them.

Regenerative heat exchangers using solid material in pellet form require means for moving the hot and cold pellets which is inconvenient and expensive to build. Besides, even shallow beds of pellets, stationary or fluidized, show high resistance to the flow of gas or air which is unacceptable for many purposes. Regenerative heat exchangers with moving matrices require also moving seals between the hot and cold parts of these matrices which are difficult to maintain tight, causing appreciable leakage losses, epsecially when larger pressure differences between the cold and hot streams of gas, air or vapors have to be dealt with.

It is an object of this invention to use stationary solid matrices having low flow resistance in the direction of the flow of the gases, vapors or air, to be processed and large heat storage capacity by which is meant a capacity to store the heat of a given gas, air or vapor stream during a time from thirty minutes to many hours, and to discharge the heat during freely selectable time and time intervals into another gas, air or vapor stream of similar or different pressure. It is a further object of this invention to use a stationary matrix heat accumulator in an elastic fluid turbine power plant, charging it at substantially atmospheric pressure by a stream of hot gases and discharging it into the compressed fluid issuing from the compressor thereby heating said fluid before it enters the elastic fluid turbine wherein, by expansion, it produces power, said expanded elastic fluid being thereafter discharged into a second stationary matrix through which it is arranged to flow for further cooling before being discharged, for example, to the ambient atmosphere.

These and other more specific objects are achieved by my invention, as will be apparent from the following description and claims, taken in accordance with the accompanying drawings, forming a part of this application in which by way of non-limiting examples:

Fig. 1 shows a simple embodiment of my invention for an air turbine power plant for providing peak loads.

Fig. 2 indicates a plant in which the matrix is charged at near atmospheric pressure and in which its discharge occurs while the air turbine operates as closed cycle.

Reverting now in more detail to Fig. 1 of the drawing in which 10 is a closed shell of any desired shape of cross section, preferably cylindrical, with a length to diameter ratio larger than 3:1, shown with its axis in vertical position but not restricted to this position. At the first end said shell is connected to the air compressor 11 with air intake at 12 and discharge conduit 13 with interposed valve 14. Near the first end the shell may be connected to the ambient atmosphere through the stack 15 with valve 16. At the second end said shell 10 is provided with a furnace space 17 from which the conduit 18, equipped with flap valve 19, leads to the inlet of the air turbine 20, which is mechanically coupled to the compressor 11 and, if desired, to a power consumer, for example an electric generator 21 and a starter motor 22 of any kind. The furnace 17 is further connected near the second end of shell 10 with a combustion chamber 23 which may be supplied and with fuel of any kind, for example liquid fuel, from the valved nozzle 25. The combustion chamber 23 may also be connected by the valved conduit 26 to a source of hot gases, air or vapors (not shown), for example a boiler or waste heat from an external process including nuclear reactors. The combustion chamber 23 is further connected by a conduit 27 with valve 27' to the first end of a second shell 28 which near the same end is also connected to the outlet of the air turbine 20 by conduit 29 with flap valve 30. The shell 28 which may be disposed with its axis in vertical position or any other position, connects near its second (lower) end to the ambient atmosphere via the conduit 31 with interposed valve 32, and via the conduit 33, with interposed valve 34, with the forced draft fan 35 which may be driven from an external power source of any kind, for example an electric motor (not shown). Both shells 10 and 28 which are heat-insulated inside and/or outside to reduce heat loss by radiation or convection (not shown) are for the most part of their lengths filled with matrices of solid materials 10' and 28' which are supported in these shells by the foraminous screens 37 and 38, respectively.

The matrices may consist of any solid material of suitable mechanical strength able to withstand high temperatures and heat shock, and having enough heat capacity to store large amounts of heat, for example metals, alloys, carbides, alumina, bauxite, periclase, beryllia, Stellite, zirconia, mullite.

It is, however, essential for the purposes of my invention that the matrices show minimum flow resistance to the air, gas or vapors flowing lengthwise through them. This is achieved by proper shaping or arrangement of the matrix material in the shells. Wires or rods of matrix material of small cross section, disposed lengthwise in the shells or corrugated metal sheets are examples of such arrangements.

The plant as per Fig. 1 works as peak power porducing air turbine plant as follows: Starting from cold, the fan 35, with valves 27' and 33 open, and the valve 31 closed, is started, creating an airstream upwards in the shell 28. With valve 30 closed, the air flows via conduit 27 into the combustion chamber 23 while the valve 26 is kept closed. In the chamber 23 fuel is burned in said air stream by opening the fuel nozzle 25 and igniting it. The thus produced hot combustion gases enter the shell 10, with valve 19 closed, and flow upwards through the matrix 10' thereby heating it, being discharged through conduit 15, with valve 16 open, to the ambient atmosphere. This continues until substantially all of the matrix material is heated to the desired temperature. In this condition the shell 10, with the fan 35 stopped and the fuel supply cut off, can be kept for many hours with very little heat loss to the outside. If, for example 5 hours after completion of the charging of the shell, suddenly power is needed to cover a deficiency, valve 34 is closed, 30 opened, 19 opened, 16 closed, 14 opened and the starter motor 22 energized. The power set consisting of the compressor 11, the turbine 20 and the generator 21 begins to rotate. The compressed air stream from the compressor flows via conduit 13 into the shell 10, flowing downward through the hot matrix and being heated by contact with it, continuing through conduit 18 to the turbine 20, in which it expands thus producing power to drive the compressor and generator 21. The still considerably hot exhaust gases from the turbine continue to flow downwards through the second matrix 28', heating it, and leave cold through conduit 31 to the atmosphere. The power production can continue as long as the matrix 10' continues to heat the air to a sufficient temperature, which obviously depends on the mass of the matrix 10', increasing in proportion with it.

If, as is often the case in practice, peak power requirements recur in certain intervals, it will be necessary to again charge the matrix 10' to prepare for such anticipated power requirements.

The procedure is exactly the same as described before, however, as is characteristic to this invention, the matrix 28' has been left charged from the previous discharge. If now the fan 35 is started, it forces the air through the hot matrix 28', thereby preheating it before it reaches the combustion chamber 23. It is obvious that this preheating of the combustion air decreases the fuel requirements for charging the matrix 10' radically, thus increasing the economy of peak power production which is poor in known plants for this purpose. The matrix 28' acts thermodynamically in exactly the same manner as a recuperator in a conventional constant load plant, which means that for example in a plant with a temperature at the outlet of matrix 10' of 800 deg. C. and an assumed regenerative effectiveness of 75% of matrix 28' the efficiency of the power cycle is increased by more than 50%. Even at 50% effectiveness the cycle efficiency rises by about 30%.

Preliminary calculations have shown that the total volume and weight of a plant according to this invention compares well with other known methods of energy storage such as steam accumulators, quite apart from the complicated and heavy machinery involved as compared with the simplicity of the air turbine plant. There are no high air pressures involved for shell 10, and atmospheric pressure only for shell 28, which further simplifies the plant according to this invention when compared with other systems.

Fig. 2 illustrates diagrammatically a plant which during power production operates on the closed cycle. Identical components with those in Fig. 1 are designated by the same numerals. As can be seen, the compressor intake 12 is connected to the conduit 33 by the valved conduit 39 with interposed aftercooler 40 with cooling coil 41 for water, for example. From conduit 39 a conduit 42 with valve 43 is branched off to the atmosphere. Another valve 44 is interposed in conduit 39 between the aftercooler and conduit 33. Branched off the conduit 13 is another conduit 45 with valve 46, which connects to a source of compressed air or gas 47. With valve 43 open and the valves 44 and 45 closed, the plant operates on the open cycle as per Fig. 1. If, after the discharge of the matrix 10 has begun, valve 44 is opened, and valves 27' and 43 closed, and the aftercooler is supplied with cooling water, the air circuit through the plant is closed. If then the pressure in the air cycle is increased to a desired degree by opening the valve 46 temporarily, the power output of the plant can be increased in proportion to the increase of density of the working air, as known per se. This has in this plant another advantage in that the heat transfer from the matrices to the denser air and vice versa is also improved. An auxiliary combustion chamber 48 with fuel nozzle 49 may be interposed in conduit 18 for quicker starting of the plant and/or for output regulation during open cycle operation.

The fact that the plant according to this invention does not require combustion to be maintained during power production, and not even an oxygen supply while operating on the closed cycle, makes application also on locomotives, ships, submarines attractive.

Obviously, with the chamber 48 in operation, the plants as per Figs. 1 or 2 can also operate as simple open cycle gas turbines continuously without using the matrices, exhausting at 31.

Such operation, preferably at partial load, can also continue while the matrix 10' is being charged, if a valved bypass conduit 50, as shown in Figs. 1 and 2, is opened. The gases issuing from the turbine 20 are mixed in the shell 28 with the air from fan 25 and the mixture enters the combustion chamber 23 via the conduit 27.

It is immaterial for the purposes of this invention whether more than two matrices are employed in a plant, arranged to work in series or parallel, whether or not intercooling is employed between stages of compression and what type of compressors and/or turbines are used. It is further immaterial what type of aftercooler is employed either of the recuperative or water injection type.

Having now described and illustrated my invention, I wish it to be understood that my invention is not to be limited to the specific forms and arrangements of parts herein described and shown, or specifically covered by my claims.

What I claim is:

1. Elastic fluid power plant for intermittent power production using stationary matrices of solid material for transferring heat by contact to or from the working fluid, said plant comprising a compressor having an inlet opening open to the ambient atmosphere, and an outlet opening for the compressed fluid, a first matrix disposed in a first closed shell, said shell having an inlet opening and a valved outlet opening to the atmosphere at its first end, a second outlet opening and a fuel burning combustion chamber at its second end, expansion turbine means for the elastic fluid having an inlet opening and an outlet opening, a second matrix disposed in a second shell having an inlet opening and an outlet opening for the elastic fluid at its first end, an inlet opening and an outlet opening at its second end, valved conduit means connecting in sequence the outlet opening from the compressor to the inlet opening at the first end of the first shell, the outlet opening at the second end of the first shell to the inlet opening of said turbine, the outlet opening of said turbine to the inlet opening at the first end of said second shell, the outlet opening at the second end of said second shell to the atmosphere, a fan for taking air from the atmosphere for delivery via the said inlet opening at the second end of said second shell into the latter, and conduit means connecting the outlet opening at the first end of said second shell to the said combustion chamber, means for mechanically coupling said compressor and said expansion turbine means to drive said compressor and to produce useful energy.

2. Elastic fluid power plant as set forth in claim 1, having auxiliary fuel burning air heater means interposed in the conduit between the outlet opening at the second end of the first shell and the inlet opening of said expansion turbine means for starting and regulating the output.

3. Elastic fluid power plant as set forth in claim 2, having valved conduit means for connecting the conduit means between the outlet of said compressor with the conduit means connecting the first shell with said turbine means in front of said auxiliary fuel burning air heater means.

4. Elastic fluid power plant as set forth in claim 1, having valved conduit means for feeding hot gases from a source outside the said power plant into said first shell at its second end.

5. Elastic fluid power plant as set forth in claim 1, having starter motor means in driving relation to said compressor and expansion turbine for starting the plant.

6. Elastic fluid power plant as set forth in claim 1, for operation as a closed cycle power plant, having valved conduit means for connecting the said intake opening of the compressor to the said second outlet opening at the second end of said second shell, and a cooler for the elastic fluid interposed in said latter conduit.

7. Elastic fluid as set forth in claim 6, having valved conduit means branched off from the conduit means connecting the outlet opening of said compressor with said first shell, and a source of compressed elastic fluid connected to said branched off conduit, for increasing the density of the working fluid circulating in the power cycle.

No references cited.